E. PECK.
Steam-Plow.
No. 18,600. Patented Nov. 10, 1857.
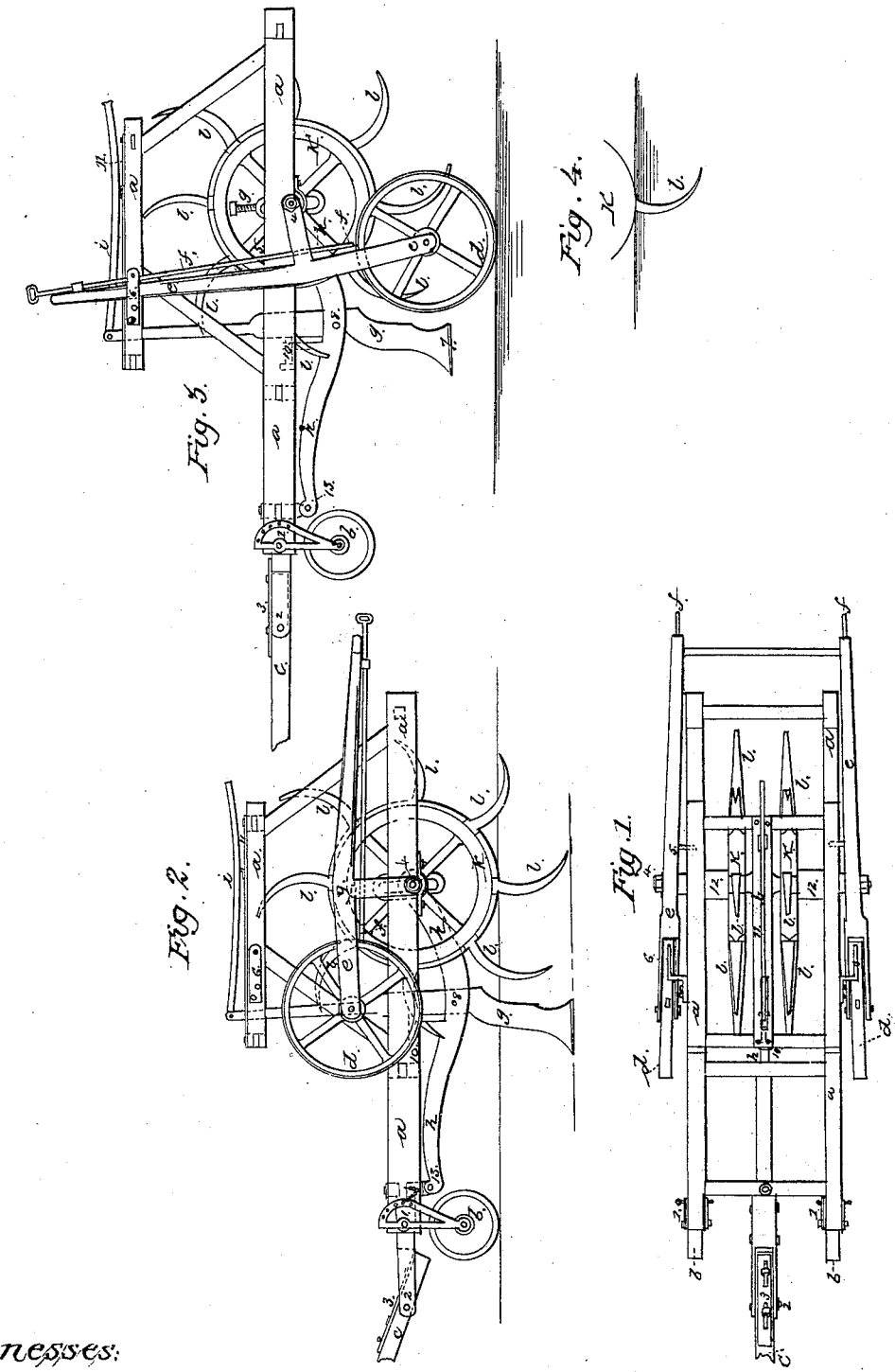

UNITED STATES PATENT OFFICE.

EZRA PECK, OF DEER PARK, NEW YORK.

IMPROVEMENT IN DIGGING-PLOWS.

Specification forming part of Letters Patent No. 18,600, dated November 10, 1857.

*To all whom it may concern:*

Be it known that I, EZRA PECK, of Deer Park, in the county of Suffolk and State of New York, have invented, made, and applied to use certain new and useful Improvements in Digging-Plows; and I do hereby declare that the following is a full, clear, and exact description of the construction and operation of the same, reference being had to the annexed drawings, making part of this specification, wherein—

Figure 1 is a plan of my digging-plow complete. Fig. 2 is a side elevation of the same as in use. Fig 3 is a side elevation of the said plow as it would appear when adapted for transportation from place to place; and Fig. 4 shows the operation of one of the digging-plows detached.

Similar marks of reference indicate the same parts.

The nature of my said invention consists of curved teeth attached to a rolling cylinder, in combination with a horizontal share traveling beneath the surface, set and acting both to loosen the under part of the soil and also act as a resistance to insure the teeth of said cylinder passing into the earth.

In the drawings, $a$ is a frame-work, suitably made and fitted to receive the parts.

$b\ b$ are regulating-wheels, attached by arcs 1 1 to the frame $a$ at the forward end in a manner similar to the regulating-wheels of plows, so as to determine the height of the frame from the ground.

$c$ is the tongue or pole, attached by the jaws and bolt 2 to the frame $a$. This tongue is to be loose when the digging-plows are in operation; but when the same are not in action and the machine is being transported the tongue is to be made stiff with the frame by sliding the bolt 3 back over the jaws or beneath a staple.

$d\ d$ are wheels on the ends of lever-arms $e$, which move on the shaft 4 as a center, and said lever-arms are connected to each other at the rear ends, and have bolts $f\ f$ set to slide lenthwise of the said levers, the ends of which bolts pass into holes in the wheels $d$. The operation of this part is that if the machine is in work, and it becomes necessary to elevate the digging-plows for the purposes of transportation, the attendant presses in the bolts $f$, which, taking the holes in the wheels $d$, prevent them from turning. He also lifts on the rear end of the levers $e\ e$, and the wheels $d\ d$, coming down onto the ground, drag instead of rolling, and the progression of the machine causes the plows to be elevated as the levers $e\ e$ come up into a vertical or nearly vertical position.

5 5 are pins projecting from the bolts $f\ f$, which, as the said levers $e\ e$ come up into the position shown in Fig. 3, take the edge of the frame $a$ and cause the withdrawal of the bolts $f$ from the wheels $d$, leaving them free to revolve as the machine is drawn along.

6 6 are receiving-forks taking the levers $e$ when in their nearly vertical position, and pins may be inserted to retain said levers $e$ in place. By adjusting the position of these forks 6 the machine can be properly balanced on the wheels $d\ d$.

7 is a horizontal share on the plow or colter $g$, which colter is attached by a bolt to the beam $h$ and extends upward to the connecting-rod $i$, which is provided with a latch taking an opening in the bar 11. By drawing this bar $i$ backward the angle of the share 7 will be such as to cause the same to run out of the ground on turning the headland. The plow-beam is attached to the frame at 13, and provided with a slot at the rear end passing the shaft 4, and 9 is an adjusting-screw regulating the depth to which the share 7 passes.

10 is an adjusting-screw to regulate the position of the colter $g$ vertically and cause the share 7 to assume the correct horizontal position without running out of or too much into the earth.

Around the shaft 4 narrow cylinders $k$ are placed. The drawings show two; but there may be a greater number, and each cylinder may be of any desired dimensions, the other parts being properly proportioned, and the hubs of said cylinders should be turned off to set within cylindrical boxes 12 to exclude dirt in any convenient manner. The edges of the cylinders $k$ are beveled or V shaped to prevent the earth clogging, and the teeth $l\ l$ are attached to the cylinder by a tenon on each entering a mortise in said cylinder. The curved shape of these teeth $l$ is made in the manner shown in the drawings having a particular object in view, viz. As the cylinder $k$ rolls along on the surface the point of each tooth in succession takes the earth and enters the same in a curved line, due to the forward progression of the cylinder. I therefore form the teeth in this curved line so that as the cylinder rolls forward and presses the tooth down it enters almost its whole length into the earth without disturbing the same but very little, because the tooth itself follows the line of motion of the point. If this curve were rigidly followed to the base of the tooth, the same would be apt to commence too soon to lift the earth, because the pressure on the back of the tooth as the fulcrum on which the earth is lifted would prevent the further descent of the tooth into the earth. I therefore cause the tooth to be drawn back from this curved line sufficient to cause the same to settle down fully into the earth. The peculiar shape of the tooth will be apparent on reference to Fig 4, in which the dotted line represents the path described by the point of the tooth as the cylinder rolls along, and the full lines show the shape in which I construct my teeth for the purposes above enumerated. As the cylinder moves forward the teeth are successively raised, lifting and loosening the earth in the most efficient manner, and the horizontal share 7 becomes a resistance to draw the teeth into the earth as the machine is rolled along.

Having thus described the construction and operation of my digging-plow, I wish it to be understood that I do not claim a rolling cylinder with either straight or curved teeth, as this has before been used; but I am not aware of any tooth having before been constructed and shaped in the manner shown, so as to enter the earth with only a very small expenditure of power as the cylinder progresses.

What I claim as my invention, and desire to secure by Letters Patent, is—

The colter $g$ and its horizontal share 7, in combination with the cylinder $k$ of teeth $l$, the whole constructed and acting substantially as specified.

In witness whereof I have hereunto set my signature this 9th day of September, 1857.

EZRA PECK.

Witnesses:
LEMUEL W. SERRELL,
THOMAS G. HAROLD.